(12) United States Patent
Misonou et al.

(10) Patent No.: US 7,300,607 B2
(45) Date of Patent: Nov. 27, 2007

(54) CONDUCTIVE SINTERED COMPACT FOR FIXING ELECTRODES IN ELECTRONIC DEVICE ENVELOPE

(75) Inventors: Toshiyuki Misonou, Mobara (JP); Masahiro Kato, Mobara (JP)

(73) Assignee: Futaba Corporation, Mobara-shi, Chiba-ken (JP)

( * ) Notice: Subject to any disclaimer, the term of this patent is extended or adjusted under 35 U.S.C. 154(b) by 303 days.

(21) Appl. No.: 10/855,038

(22) Filed: May 27, 2004

(65) Prior Publication Data

US 2005/0161811 A1    Jul. 28, 2005

(30) Foreign Application Priority Data

May 28, 2003   (JP) ............................. 2003-150294
May 28, 2003   (JP) ............................. 2003-150295

(51) Int. Cl.
  *H01B 1/02*       (2006.01)
  *H01B 1/22*       (2006.01)
  *H01B 1/00*       (2006.01)

(52) U.S. Cl. .................... 252/518.1; 252/514; 252/500

(58) Field of Classification Search ................ 252/500, 252/62.9 PZ, 514, 518.1; 501/136
  See application file for complete search history.

(56) References Cited

U.S. PATENT DOCUMENTS 6,866,800 B2 * 3/2005 Adachi .................. 427/98.4
2003/0102465 A1 * 6/2003 Nagai et al. ............. 252/500
2003/0201428 A1 * 10/2003 Fukushima et al. ......... 252/570

FOREIGN PATENT DOCUMENTS

| JP | 03-152837   | 6/1991  |
| JP | 04-269403   | 9/1992  |
| JP | 07-105719   | * 4/1995 |
| JP | 07-254360   | 10/1995 |
| JP | 11-329072   | 11/1999 |
| JP | 2000-048642 | 2/2000  |

OTHER PUBLICATIONS

Patent Abstracts Of Japan, Abstract for Japanese Patent Laid-Open Publication No. 04-269403, Sep. 25, 1992.
Patent Abstracts Of Japan, Abstract for Japanese Patent Laid-Open Publication No. 07-254360, Oct. 3, 1995.
Patent Abstracts Of Japan, Abstract for Japanese Patent Laid-Open Publication No. 03-152837, Jun. 28, 1991.
Patent Abstracts Of Japan, Abstract for Japanese Patent Laid-Open Publication No. 11-329072, Nov. 30, 1999.
Patent Abstracts Of Japan, Abstract for Japanese Patent Laid-Open Publication No. 2000-48642, Jul. 24, 1998.

* cited by examiner

*Primary Examiner*—Mark Kopec
*Assistant Examiner*—Jaison Thomas
(74) *Attorney, Agent, or Firm*—Quarles & Brady LLP

(57) ABSTRACT

A conductive sintered compact for fixing electrodes inside an electronic device envelope is provided. The sintered compact is made of a conductive composition calcined. The conductive composition includes at least 10 vol % to 60 vol % of Ag particles, a low melting-point glass containing 10 vol % to 80 vol % of $B_2O_3$, 0 vol % to 70 vol % of ceramic particles, and a metal oxide series pigment. The total amount of the ceramic particles and the metal oxide series pigment is at least 10 vol % or more.

6 Claims, 14 Drawing Sheets

FIXING STRENGTH OF EACH MATERIAL

CALCINATION TEMPERATURE AND FIXING STRENGTH

FIXING FORCE AT INTERMEDIATE TEMPERATURE

FIXING FORCE OF EACH MATERIAL

CALCINATION TEMPERATURE AND FIXING FORCE

FIG.8

| MATERIAL | ① | ② | ③ | ④ | ⑤ | ⑥ | ⑦ | ⑧ | ⑨ | ⑩ | ⑪ |
|---|---|---|---|---|---|---|---|---|---|---|---|
| Ag | 0 | 10 | 20 | 30 | 40 | 50 | 60 | 70 | 80 | 90 | 100 |
| GLASS | 30 | 9 | 30 | 20 | 10 | 10 | 10 | 10 | 5 | 0 | 0 |
| FILLER | 60 | 69 | 50 | 50 | 40 | 30 | 20 | 10 | 5 | 0 | 0 |
| PIGMENT | 10 | 10 | 10 | 10 | 10 | 10 | 10 | 10 | 10 | 10 | 0 |
| RESISTANCE R [Ω/□] | ∞ | 10 | 2 | 1 | 1 | 1 | 1 | 1 | 1 | 1 | 1 |
| α [×10-7/°C] | 17.4 | 19.82 | 100.8 | 109.7 | 112.6 | 126.3 | 140 | 153.7 | 165 | 176.3 | 197 |
| FIXING STRENGTH (AT INTERMEDIATE TEMPERATURE 350°C) [g] | 0 | 80 | 100 | 100 | 100 | 100 | 100 | 100 | 100 | 100 | 100 |
| FIXING STRENGTH (IN CALCINATION AT 450°C) [g] | 2600 | 2100 | 2800 | 2700 | 2500 | 2500 | 2500 | 2500 | 2000 | 1300 | 1500 |

FIG.9

| MATERIAL | ②-1 | ②-2 | ②-3 | ②-4 | ②-5 | ②-6 | ②-7 | ②-8 | ②-9 | ②-10 |
|---|---|---|---|---|---|---|---|---|---|---|
| Ag | 10 | 10 | 10 | 10 | 10 | 10 | 10 | 10 | 10 | 10 |
| GLASS | 0 | 10 | 20 | 30 | 40 | 50 | 60 | 70 | 80 | 90 |
| FILLER | 80 | 70 | 60 | 50 | 40 | 30 | 20 | 10 | 0 | 0 |
| PIGMENT | 10 | 10 | 10 | 10 | 10 | 10 | 10 | 10 | 10 | 10 |
| RESISTANCE R [Ω/□] | 10 | 10 | 10 | 10 | 10 | 10 | 10 | 10 | 10 | 10 |
| α [×10-7/°C] | 66.7 | 71.5 | 76.3 | 81.1 | 85.9 | 90.7 | 95.5 | 100.3 | 105.1 | 116.9 |
| FIXING STRENGTH (AT INTERMEDIATE TEMPERATURE 350°C) [g] | 80 | 80 | 80 | 80 | 80 | 80 | 80 | 80 | 80 | 80 |
| FIXING STRENGTH (IN CALCINATION AT 450°C) [g] | 1000 | 2500 | 2700 | 2900 | 3000 | 3600 | 3700 | 4000 | 4500 | 5000 |

FIG.10

| MATERIAL | ③-1 | ③-2 | ③-3 | ③-4 | ③-5 | ③-6 | ③-7 | ③-8 | ③-9 |
|---|---|---|---|---|---|---|---|---|---|
| Ag | 20 | 20 | 20 | 20 | 20 | 20 | 20 | 20 | 20 |
| GLASS | 0 | 10 | 20 | 30 | 40 | 50 | 60 | 70 | 80 |
| FILLER | 70 | 60 | 50 | 40 | 30 | 20 | 10 | 0 | 0 |
| PIGMENT | 10 | 10 | 10 | 10 | 10 | 10 | 10 | 10 | 0 |
| RESISTANCE R [Ω/□] | 2 | 2 | 2 | 2 | 2 | 2 | 2 | 2 | 2 |
| $\alpha [\times 10^{-7}/°C]$ | 80.4 | 85.2 | 90 | 94.8 | 99.6 | 104.4 | 109.2 | 114 | 125.8 |
| FIXING STRENGTH (AT INTERMEDIATE TEMPERATURE 350°C) [g] | 100 | 100 | 100 | 100 | 100 | 100 | 100 | 100 | 100 |
| FIXING STRENGTH (IN CALCINATION AT 450°C) [g] | 1000 | 2000 | 2800 | 3500 | 3500 | 3700 | 3800 | 4100 | 4600 |

FIG.11

| MATERIAL | ④-1 | ④-2 | ④-3 | ④-4 | ④-5 | ④-6 | ④-7 | ④-8 |
|---|---|---|---|---|---|---|---|---|
| Ag | 30 | 30 | 30 | 30 | 30 | 30 | 30 | 30 |
| GLASS | 0 | 10 | 20 | 30 | 40 | 50 | 60 | 70 |
| FILLER | 60 | 50 | 40 | 30 | 20 | 10 | 0 | 0 |
| PIGMENT | 10 | 10 | 10 | 10 | 10 | 10 | 10 | 0 |
| RESISTANCE R [Ω/□] | 1 | 1 | 1 | 1 | 1 | 1 | 1 | 1 |
| $\alpha [\times 10^{-7}/°C]$ | 94.1 | 98.9 | 103.7 | 108.5 | 113.3 | 118.1 | 122.9 | 134.7 |
| FIXING STRENGTH (AT INTERMEDIATE TEMPERATURE 350°C) [g] | 100 | 100 | 100 | 100 | 100 | 100 | 100 | 100 |
| FIXING STRENGTH (IN CALCINATION AT 450°C) [g] | 1000 | 2500 | 3000 | 3600 | 3600 | 3800 | 3800 | 3800 |

FIG.12

| MATERIAL | ⑤-1 | ⑤-2 | ⑤-3 | ⑤-4 | ⑤-5 | ⑤-6 | ⑤-7 |
|---|---|---|---|---|---|---|---|
| Ag | 40 | 40 | 40 | 40 | 40 | 40 | 40 |
| GLASS | 0 | 10 | 20 | 30 | 40 | 50 | 60 |
| FILLER | 50 | 40 | 30 | 20 | 10 | 0 | 0 |
| PIGMENT | 10 | 10 | 10 | 10 | 10 | 10 | 0 |
| RESISTANCE R [Ω/□] | 1 | 1 | 1 | 1 | 1 | 1 | 1 |
| $\alpha [\times 10^{-7}/°C]$ | 78.3 | 89 | 99.7 | 110.4 | 121.1 | 131.8 | 143.6 |
| FIXING STRENGTH (AT INTERMEDIATE TEMPERATURE 350°C) [g] | 100 | 100 | 100 | 100 | 100 | 100 | 100 |
| FIXING STRENGTH (IN CALCINATION AT 450°C) [g] | 1000 | 2500 | 3200 | 3700 | 3700 | 3800 | 3800 |

FIG.13

| MATERIAL | ⑥-1 | ⑥-2 | ⑥-3 | ⑥-4 | ⑥-5 | ⑥-6 |
|---|---|---|---|---|---|---|
| Ag | 50 | 50 | 50 | 50 | 50 | 50 |
| GLASS | 0 | 10 | 20 | 30 | 40 | 50 |
| FILLER | 40 | 30 | 20 | 10 | 0 | 0 |
| PIGMENT | 10 | 10 | 10 | 10 | 10 | 0 |
| RESISTANCE R [Ω/□] | 1 | 1 | 1 | 1 | 1 | 1 |
| $\alpha [\times 10^{-7}/°C]$ | 121.5 | 126.3 | 131.1 | 135.9 | 140.7 | 152.5 |
| FIXING STRENGTH (AT INTERMEDIATE TEMPERATURE 350°C) [g] | 100 | 100 | 100 | 100 | 100 | 100 |
| FIXING STRENGTH (IN CALCINATION AT 450°C) [g] | 1000 | 2800 | 3000 | 3500 | 3700 | 3700 |

FIG.14

| MATERIAL | ⑦-1 | ⑦-2 | ⑦-3 | ⑦-4 | ⑦-5 |
|---|---|---|---|---|---|
| Ag | 60 | 60 | 60 | 60 | 60 |
| GLASS | 0 | 10 | 20 | 30 | 40 |
| FILLER | 30 | 20 | 10 | 0 | 0 |
| PIGMENT | 10 | 10 | 10 | 10 | 0 |
| RESISTANCE R [Ω/□] | 1 | 1 | 1 | 1 | 1 |
| $\alpha [\times 10^{-7}/°C]$ | 17.5 | 128.2 | 138.9 | 149.5 | 161.4 |
| FIXING STRENGTH (AT INTERMEDIATE TEMPERATURE 350°C) [g] | 100 | 100 | 100 | 100 | 100 |
| FIXING STRENGTH (IN CALCINATION AT 450°C) [g] | 1000 | 2600 | 3200 | 3500 | 3700 |

FIG.15

| MATERIAL | ②-2 | ②-9 |
|---|---|---|
| Ag | 10 | 10 |
| GLASS | 10 | 80 |
| FILLER | 70 | 0 |
| PIGMENT | 10 | 10 |
| RESISTANCE R [Ω/□] | 10 | 10 |
| $\alpha [\times 10^{-7}/°C]$ | 71.5 | 105.1 |
| FIXING STRENGTH (AT INTERMEDIATE TEMPERATURE 350°C) [g] | 80 | 80 |
| FIXING STRENGTH (IN CALCINATION AT 450°C) [g] | 2500 | 4500 |

FIG.16

INTERMEDIATELY WELDED LEAD

| SAMPLE NO.<br>COMPONENT | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| Ag POWDER [vol%] | 10 | 15 | 18 | 20 | 24 | 26 | 30 | 33 | 35 | 40 | 42 | 45 | 50 | 55 | 60 |
| GLASS POWDER [vol%] | 20 | 20 | 20 | 20 | 20 | 20 | 20 | 20 | 20 | 20 | 20 | 20 | 20 | 20 | 20 |
| LOW THERMAL-EXPANSION FILLER POWDER [vol%] | 70 | 65 | 62 | 60 | 56 | 54 | 50 | 47 | 45 | 40 | 38 | 35 | 30 | 30 | 20 |
| α[×10-7/°C] | 83.3 | 90.15 | 94.26 | 97 | 102.48 | 105.22 | 110.7 | 114.81 | 117.55 | 124.4 | 127.14 | 131.25 | 138.1 | 147.95 | 151.8 |
| CRACK | O.K. | O.K. | O.K. | O.K. | O.K. | O.K. | O.K. | O.K. | O.K. | O.K. | O.K. | O.K. | O.K. | NG | NG |

FIG.17

| MATERIAL | ① | ② | ③ | ④ | ⑤ | ⑥ | ⑦ | ⑧ | ⑨ | ⑩ | ⑪ |
|---|---|---|---|---|---|---|---|---|---|---|---|
| Ag | 0 | 10 | 20 | 30 | 40 | 50 | 60 | 70 | 80 | 90 | 100 |
| GLASS | 30 | 9 | 30 | 20 | 10 | 10 | 10 | 10 | 5 | 0 | 0 |
| FILLER | 60 | 69 | 50 | 50 | 40 | 30 | 20 | 10 | 5 | 0 | 0 |
| PIGMENT | 10 | 10 | 10 | 10 | 10 | 10 | 10 | 10 | 10 | 10 | 0 |
| RESISTANCE R [Ω/□] | ∞ | 10 | 2 | 1 | 1 | 1 | 1 | 1 | 1 | 1 | 1 |
| α[×10⁻⁷/°C] | 45.5 | 53.05 | 80.9 | 93.1 | 101.3 | 117 | 132.7 | 148.4 | 162.35 | 176.3 | 197 |
| FIXING STRENGTH (AT INTERMEDIATE TEMPERATURE 350°C) [g] | 0 | 80 | 100 | 100 | 100 | 100 | 100 | 100 | 100 | 100 | 100 |
| FIXING STRENGTH (IN CALCINATION AT 450°C) [g] | 2500 | 2000 | 2600 | 2500 | 2300 | 2300 | 2300 | 2300 | 1900 | 1000 | 1200 |

FIG.18

| MATERIAL | ②-1 | ②-2 | ②-3 | ②-4 | ②-5 | ②-6 | ②-7 | ②-8 | ②-9 | ②-10 |
|---|---|---|---|---|---|---|---|---|---|---|
| Ag | 10 | 10 | 10 | 10 | 10 | 10 | 10 | 10 | 10 | 10 |
| GLASS | 0 | 10 | 20 | 30 | 40 | 50 | 60 | 70 | 80 | 90 |
| FILLER | 80 | 70 | 60 | 50 | 40 | 30 | 20 | 10 | 0 | 0 |
| PIGMENT | 10 | 10 | 10 | 10 | 10 | 10 | 10 | 10 | 10 | 10 |
| RESISTANCE R [Ω/□] | 50.7 | 54.2 | 57.7 | 61.2 | 64.7 | 68.2 | 71.7 | 75.2 | 78.7 | 87.2 |
| FIXING STRENGTH (AT INTERMEDIATE TEMPERATURE 350°C) [g] | 80 | 80 | 80 | 80 | 80 | 80 | 80 | 80 | 80 | 80 |
| FIXING STRENGTH (IN CALCINATION AT 450°C) [g] | 800 | 2000 | 2400 | 2500 | 2600 | 2800 | 3200 | 3300 | 3400 | 3500 |

FIG.19

| MATERIAL | ③-1 | ③-2 | ③-3 | ③-4 | ③-5 | ③-6 | ③-7 | ③-8 | ③-9 |
|---|---|---|---|---|---|---|---|---|---|
| Ag | 20 | 20 | 20 | 20 | 20 | 20 | 20 | 20 | 20 |
| GLASS | 0 | 10 | 20 | 30 | 40 | 50 | 60 | 70 | 80 |
| FILLER | 70 | 60 | 50 | 40 | 30 | 20 | 10 | 0 | 0 |
| PIGMENT | 10 | 10 | 10 | 10 | 10 | 10 | 10 | 10 | 0 |
| RESISTANCE R [Ω/□] | 2 | 2 | 2 | 2 | 2 | 2 | 2 | 2 | 2 |
| $\alpha [\times 10^{-7}/°C]$ | 66.4 | 69.9 | 73.4 | 76.9 | 80.4 | 83.9 | 87.4 | 90.9 | 99.4 |
| FIXING STRENGTH (AT INTERMEDIATE TEMPERATURE 350°C) [g] | 100 | 100 | 100 | 100 | 100 | 100 | 100 | 100 | 100 |
| FIXING STRENGTH (IN CALCINATION AT 450°C) [g] | 800 | 900 | 1800 | 2600 | 3400 | 3400 | 3600 | 3700 | 4000 |

FIG.20

| MATERIAL | ④-1 | ④-2 | ④-3 | ④-4 | ④-5 | ④-6 | ④-7 | ④-8 |
|---|---|---|---|---|---|---|---|---|
| Ag | 30 | 30 | 30 | 30 | 30 | 30 | 30 | 30 |
| GLASS | 0 | 10 | 20 | 30 | 40 | 50 | 60 | 70 |
| FILLER | 60 | 50 | 40 | 30 | 20 | 10 | 0 | 0 |
| PIGMENT | 10 | 10 | 10 | 10 | 10 | 10 | 10 | 0 |
| RESISTANCE R [Ω/□] | 1 | 1 | 1 | 1 | 1 | 1 | 1 | 1 |
| $\alpha [\times 10^{-7}/°C]$ | 82.1 | 85.6 | 89.1 | 92.6 | 96.1 | 99.6 | 103.1 | 111.6 |
| FIXING STRENGTH (AT INTERMEDIATE TEMPERATURE 350°C) [g] | 100 | 100 | 100 | 100 | 100 | 100 | 100 | 100 |
| FIXING STRENGTH (IN CALCINATION AT 450°C) [g] | 800 | 2300 | 2800 | 3500 | 3500 | 3500 | 3500 | 3500 |

FIG.21

| MATERIAL | | ⑤-1 | ⑤-2 | ⑤-3 | ⑤-4 | ⑤-5 | ⑤-6 | ⑤-7 |
|---|---|---|---|---|---|---|---|---|
| Ag | | 40 | 40 | 40 | 40 | 40 | 40 | 40 |
| GLASS | | 0 | 10 | 20 | 30 | 40 | 50 | 60 |
| FILLER | | 50 | 40 | 30 | 20 | 10 | 0 | 0 |
| PIGMENT | | 10 | 10 | 10 | 10 | 10 | 10 | 0 |
| RESISTANCE R [Ω/□] | | 1 | 1 | 1 | 1 | 1 | 1 | 1 |
| α [×10⁻⁷/°C] | | 97.8 | 101.3 | 104.8 | 108.3 | 111.8 | 115.3 | 123.8 |
| FIXING STRENGTH (AT INTERMEDIATE TEMPERATURE 350°C) [g] | | 100 | 100 | 100 | 100 | 100 | 100 | 100 |
| FIXING STRENGTH (IN CALCINATION AT 450°C) [g] | | 800 | 900 | 2000 | 2800 | 3300 | 3300 | 3300 |

FIG.22

| MATERIAL | ⑥-1 | ⑥-2 | ⑥-3 | ⑥-4 | ⑥-5 | ⑥-6 |
|---|---|---|---|---|---|---|
| Ag | 50 | 50 | 50 | 50 | 50 | 50 |
| GLASS | 0 | 10 | 20 | 30 | 40 | 50 |
| FILLER | 40 | 30 | 20 | 10 | 0 | 0 |
| PIGMENT | 10 | 10 | 10 | 10 | 10 | 0 |
| RESISTANCE R [Ω/□] | 1 | 1 | 1 | 1 | 1 | 1 |
| α [×10⁻⁷/°C] | 113.5 | 117 | 120.5 | 124 | 127.5 | 136 |
| FIXING STRENGTH (AT INTERMEDIATE TEMPERATURE 350°C) [g] | 100 | 100 | 100 | 100 | 100 | 100 |
| FIXING STRENGTH (IN CALCINATION AT 450°C) [g] | 800 | 900 | 2500 | 2600 | 2800 | 3400 |

FIG.23

| MATERIAL | ⑦-1 | ⑦-2 | ⑦-3 | ⑦-4 | ⑦-5 |
|---|---|---|---|---|---|
| Ag | 60 | 60 | 60 | 60 | 60 |
| GLASS | 0 | 10 | 20 | 30 | 40 |
| FILLER | 30 | 20 | 10 | 0 | 0 |
| PIGMENT | 10 | 10 | 10 | 10 | 0 |
| RESISTANCE R [Ω/□] | 1 | 1 | 1 | 1 | 1 |
| $\alpha [\times 10^{-7}/°C]$ | 129.2 | 132.7 | 136.2 | 139.7 | 148.2 |
| FIXING STRENGTH (AT INTERMEDIATE TEMPERATURE 350°C) [g] | 100 | 100 | 100 | 100 | 100 |
| FIXING STRENGTH (IN CALCINATION AT 450°C) [g] | 800 | 900 | 2300 | 2600 | 3500 |

FIG.24

| MATERIAL | ②-2 | ②-9 |
|---|---|---|
| Ag | 10 | 10 |
| GLASS | 10 | 80 |
| FILLER | 70 | 0 |
| PIGMENT | 10 | 10 |
| RESISTANCE R [Ω/□] | 10 | 10 |
| $\alpha [\times 10^{-7}/°C]$ | 54.2 | 78.7 |
| FIXING STRENGTH (AT INTERMEDIATE TEMPERATURE 350°C) [g] | 80 | 80 |
| FIXING STRENGTH (IN CALCINATION AT 450°C) [g] | 2000 | 3400 |

FIG.25

| SAMPLE NO.<br>COMPONENT | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| Ag POWDER [vol%] | 10 | 15 | 18 | 20 | 24 | 26 | 30 | 33 | 35 | 40 | 42 | 45 | 50 | 55 | 60 |
| GLASS POWDER [vol%] | 20 | 20 | 20 | 20 | 20 | 20 | 20 | 20 | 20 | 20 | 20 | 20 | 20 | 20 | 20 |
| LOW THERMAL-EXPANSION FILLER POWDER [vol%] | 70 | 65 | 62 | 60 | 56 | 54 | 50 | 47 | 45 | 40 | 38 | 35 | 30 | 25 | 20 |
| α [×10−7/°C] | 62.7 | 70.55 | 75.26 | 78.4 | 84.68 | 87.82 | 94.1 | 98.81 | 101.95 | 109.8 | 112.94 | 117.65 | 125.5 | 133.35 | 141.2 |
| CRACK | O.K. | O.K. | O.K. | O.K. | O.K. | O.K. | O.K. | O.K. | O.K. | O.K. | O.K. | O.K. | O.K. | O.K. | NG |

CONDUCTIVE SINTERED COMPACT FOR FIXING ELECTRODES IN ELECTRONIC DEVICE ENVELOPE

CROSS REFERENCES TO RELATED APPLICATIONS

Not Applicable.

STATEMENT REGARDING FEDERALLY SPONSORED RESEARCH

Not Applicable.

BACKGROUND OF THE INVENTION

The present invention relates to a conductive sintered compact for fixing electrodes in an electronic device envelope. More particularly, the present invention relates to a conductive fixing member for arranging electrodes mounted on predetermined areas in an electronic device envelope. For example, the present invention relates to a conductive sintered compact used to fix grid electrodes on the surface of an insulating substrate disposed inside a fluorescent display tube envelope.

Conventionally, conductive fixing members acting as internal wiring layers are used inside an envelope constituting a fluorescent display tube or the like to arrange various electrodes over the insulating substrate therein.

Usually, in order to prepare a conductive paste, Ag particles, acting as a conductive material, and a low melting point glass, acting as a fixing component, are first immersed and kneaded in an organic vehicle. The resultant conductive paste is applied over an insulating substrate by a screen printing process and then formed in a predetermined pattern. At this time, electrodes to be fixed are placed over the patterned conductive compound (the conductive paste). By baking the insulating substrate in a high temperature atmosphere, the conductive compound is solidified to fix the electrodes firmly. That is, the conductive sintered material containing Ag particles and low melting point glass as main components, or the conductive member for fixing electrodes, is obtained.

Particularly, as to fluorescent display tubes, the grid electrodes are firmly fixed and arranged over a glass substrate (an insulating substrate) with the conductive compound. Since the conductive compound is baked and solidified at a relatively low temperature of 200° C. to 500° C., lead series glass is used as a main fixing component. In this case, the conductive sintered material is called a grid intermediately-bonded electrode. This technique, called a grid intermediately-bonding system, has been widely utilized conventionally.

FIG. 1 shows the main structure of a conventional general fluorescent display tube utilizing the grid intermediately-bonding system. The fluorescent display tube shown in FIG. 1 can be conceptually applied to the grid intermediately-bonding system (to be described later in detail) utilizing the conductive sintered material according to the present invention.

In the configuration shown in FIG. 1, the fluorescent display tube includes a glass substrate 1 having an upper surface on which a $SiO_2$ film 11 is formed. An anode wiring layer 2a and a grid wiring layer 2b are formed on the $SiO_2$ film 11, respectively. An insulating layer 8 is formed over the wiring layers 2a and 2b. A grid electrode 9 in a predetermined shape on a predetermined area of the insulating layer 8 and confronting the cathode electrode 10 is firmly fixed and anchored with the intermediately-bonded electrode (a conductive sintered material) 6.

An anode electrode 5, formed of an anode conductor 3 and a fluorescent substance 4, is formed over the one anode wiring layer 2a via the through hole 7 opened in the insulating layer 8. The electrode 6 is formed over the other grid wiring layer 2b via the through hole 7 opened in the insulating layer 8, to securely fix the grid electrode 9.

Referring to FIG. 1, numeral 12 represents a crystalline glass formed over the electrode 6; numeral 13 represents a front plate; and numeral 14 represents a side plate. These elements form an envelope. Numeral 15 represents a metal lead taken out from the terminal electrode 16.

In the general grid intermediately-bonding system (that is, the conventional system), a conductive material, such as Ag particles, and a low melting point glass being a fixing component are used as main components for the electrode 6. First, the main components are immersed and kneaded in an organic vehicle to form a conductive paste having a viscosity needed as an adhesive agent. The resultant conductive paste is coated over the insulating substrate by the screen printing process and is shaped in a desired pattern. Meanwhile, the grid electrode 9 is disposed at a predetermined position in the predetermined area.

Next, the insulating substrate, on which the grid 9 is formed over a conductive paste pattern, is calcined in an atmosphere of 300° C. to 500° C. During this baking, the organic vehicle contained in the conductive paste is evaporated and sputtered, and the low melting point glass is crystallized. The resulting conductive sintered compact (or body) is used as an electrode.

In more detail, when the electrode 6 is used, the leg of the grid electrode 9 is attached at the predetermined position of the glass substrate 1, utilizing the viscosity of the conductive paste. The glass substrate 1, on which the grid electrode 9 is attached with the conductive paste pattern, is calcined. In this baking process, the low melting point glass in the paste is once fused and solidified. Thus, the grid electrode 9 is securely fixed to the glass substrate 1, as desired. The conductive material of the electrode 6 to be solidified electrically connects the grid 9 to the grid wiring layer 2b.

In that case, a conductive paste acting as the electrode 6 is prepared. The conductive paste, for example, is prepared by immersing and kneading a conductive material made of 36.7 wt % of Ag particles and 20 wt % of Al particles, a low melting point glass, lead titanate (43.3 wt %), and a metal oxide series pigment, in an organic vehicle. The resultant conductive paste is coated using a screen printing process and is shaped in a predetermined electrode pattern.

Next, the grid electrode 9 is held at a predetermined position with the conductive paste. Then, the intermediate structure is calcined at a temperature of 300° C. to 500° C. and then cooled down to obtain the electrode 6. The grid electrode 9 is securely anchored on the glass substrate 1 with the welded electrode 6. This can reduce the cracking, which occurs in the glass substrate. This technique is disclosed in Japanese Patent Laid-open Publication No. Tokkai-hei No. 3-152837.

Moreover, Japanese Patent Laid-open Publication No. Tokkai-hei 4-269404 discloses a similar technique of reducing the generation of cracks in a glass substrate. According to this art, 40 wt % of a conductive material made of a mixture of Ag particles and 10 wt % to 100 wt % of graphite particles, a Pb—Si—Zn—B series low melting point glass, and an organic vehicle are used for the conductive paste.

Moreover, Japanese Patent Laid-open Publication No. Tokkai-hei 7-254360 discloses the technique of reducing the cracking and flaking of the electrode 6 itself. According to this art, a conductive material made of 36.5 wt % to 50 wt % of Ag particles, a low melting point glass, 39 wt % to 50 wt % of lead titanate acting as a filler, 2 wt % to 18 wt % of an organic metal, and an organic vehicle are used for the conductive paste. The grid electrode 9 is fixed with the conductive paste. Then, the intermediate structure is baked at 300° C. to 500° C. and then cooled to make the electrode 6.

However, as described in the publication No. 7-254360, the organic vehicle in the conductive paste is dissolved and evaporated at about 180° C. during the heat treatment process. Thus, the conductive paste itself is dried and loses its viscosity. The softening temperature of the fritted glass formed of a low melting point glass is 320° C. Therefore, the adhesive force of the conductive composition paste at the interface between the glass substrate 1 and the grid electrode 9 is significantly reduced during the heat treatment in the temperature range.

The glass substrate 1 and the grid substrate 9, each having a different thermal expansion coefficient, expand thermally in the heat treatment so that a difference occurs between the thermal expansion amounts. For that reason, an internal stress exceeding a largely-reduced adhesive force of the conductive composition paste occurs at the interface between the glass substrate 1 and the grid electrode 9 bonded with the electrode 6. As a result, cracking can occur between the electrode 6 and the grid electrode 9 and the glass substrate 1, so that they may be finally peeled off from the glass electrode 1.

In order to overcome peeling caused by the cracking of the electrode 6, the electrode 6 is formed using the following conductive compound paste, as described previously. That is, the conductive compound paste is made of a conductive material made of 36.5 wt % to 50 wt % of Ag particles, a low melting point glass, 39 wt % to 50 wt % of lead titanate acting as a filler, 2 wt % to 18 wt % of an organic metal, and an organic vehicle.

The fixing strength was confirmed by peeling off the grid electrode 9 bonded to the electrode 6, with a spring balance. By peeling off the grid electrode 9, the electrode 6 fixed to the grid electrode 9 was peeled off from the substrate surface.

The soda lime glass has a thermal expansion coefficient of 85 to $90 \times 10^{-7}/°$ C. The insulating layer has a thermal expansion coefficient of 65 to $80 \times 10^{-7}/°$ C. The grid material formed of an alloy (of 42% Ni-6% Cr-residual Fe), SUS430 alloy, SUS398 alloy, and SUS343 alloy has a thermal expansion coefficient of $100 \times 10^{-7}/°$ C. (at 400° C.). According to one theory, differences in thermal expansion coefficient between the interfaces of these substances produce an internal distortion. Finally, the internal distortion cracks the electrode 6.

Moreover, a conductive paste not containing lead, which is an environmental load matter, for wiring conductors formed on an insulating substrate is disclosed in Japanese Patent Laid-open Publication No. Tokkai-hei 11-329072 and No. Tokkai 2000-48642. In this case, the thickness of the conductive sintered compact made of the conductive paste for wiring is 10 μm or less.

SUMMARY OF THE INVENTION

The present invention is made to solve the above-mentioned problems.

An object of the present invention is to provide a conductive sintered compact using a conductive compound, which anchors electrodes in an electronic device envelope. This sintered compact does not impair the fixing strength and the electrical characteristics of the insulating substrate, and there is very little cracking or peeling occurring in a calcination process of the conductive composition.

Another object of the present invention is to provide a conductive sintered compact, acting as an intermediately-bonded electrode, for securely fixing electrodes in an envelope of an electronic device (particularly, a fluorescent display tube). The sintered compact securely fixes electrodes, without losing the fixing strength and the electrical characteristics to the insulating substrate, and without causing peeling or cracking of the intermediately-bonded electrode and substrate during the intermediate fabrication steps or in a completed product.

Further another object of the present invention is to provide a conductive sintered compact made of a conductive compound using a low melting point glass that does not contain lead which is an environmental load substance.

As described previously, the cracking in the conductive sintered compact securely formed on the insulating substrate and/or in the interface between the conductive sintered compact and the insulating substrate (glass substrate) is caused by the calcination process essentially existing in a fluorescent display tube. The cracking is caused by the thermal expansion of the conductive compound which becomes larger than that of the glass substrate during the calcination process.

The present inventors assumed that the thermal expansion coefficients of the glass substrate and the conductive compound have to be matched mutually. Thus, the present inventors inferred that the cracking may be eliminated or reduced by setting the thermal expansion coefficient of the conductive compound to 69.0 to $140.0 \times 10^{-7}/°$ C. which is close to the thermal expansion coefficient ($90.0 \times 10^{-7}/°$ C.) of the soda lime glass.

The inventors searched for substances indicating an adhesive force in the conductive compound, at temperatures of 300° C. or less at which the low melting glass solidifies. As a result, it was found that Ag does not lose its adhesive property in the heat treatment below 300° C. Moreover, it was found that Ag can maintain enough fixing strength even in the calcination process for forming electrodes using the conductive compound or even to the intermediately-bonded electrode for fixing a grid electrode. Using the conductive compound containing, as a conductive material, Ag particles to which fillers (formed of ceramic particles) or metal oxide series pigments are added in a large compound ratio, compared with the conventional compound ratio, the inventors successfully created a conductive sintered compact having the thermal expansion coefficient close to the thermal expansion coefficient of soda lime glass.

The newly created conductive sintered compact was used for the intermediately-bonded electrode in a fluorescent display tube in the grid intermediately-bonding system. By doing so, with complicated and diversified display contents on the fluorescent display tube, the internally-bonded electrode, or the conductive sintered compact, was obtained without minute cracks in the interface between electrodes and without peeling in the interface between the glass substrate and the grid electrode.

The present invention relates to a conductive sintered compact for fixing electrodes within an electronic device envelope. The conductive sintered compact is made by calcining of a conductive composition. The conductive composition being made of 10 vol % to 60 vol % of Ag particles, a low melting-point glass containing 10 vol % to 80 vol % of $B_2O_3$, 0 vol % to 70 vol % of ceramic particles, and 5 vol % to 10 vol % of metal oxide series pigments. The total quantity of the ceramic particles and the metal oxide series pigments is at least 10 vol % or more.

In the conductive sintered compact according to the present invention, the $B_2O_3$ contained in the low melting point glass is of PbO—$B_2O_3$ series or $Bi_2O_3$—$B_2O_3$ series. The quantity of the Ag particles is 10 vol % to 35 vol %. The quantity of the low melting point glass containing said $B_2O_3$ particles is 10 vol % to 40 vol %. The quantity of the ceramic particles is 45 vol % to 70 vol %. The quantity of the metal oxide series pigments is 5 vol % to 10 vol %. The ceramic particles comprise lead titanate or zircon. The quantity ratio (volume ratio) between said Ag particles and the ceramic particles is 1:7 to 5:3 or 1:7 to 11:5. The thermal expansion coefficient of the conductive compound is $83.3 \times 10^{-7}/°$ C. to $138.1 \times 10^{-7}/°$ C. or $62.7 \times 10^{-7}/°$ C. to $125.5 \times 10^{-7}/°$ C. The surface electric resistivity of the conductive compound is 10 $\Omega/\square$ or less, where $\square$ is a centimeter square.

According to the present invention, a relatively thick conductive thin film, or a conductive sintered compact, having a thickness of 300 μm or more can be easily formed to anchor electrodes in an electronic device envelope, for example, in a fluorescent display tube, without producing any cracking. There is the advantage in that the conductive sintered compact can securely fix and hold the internal wiring conductors or electrodes. The present invention is very conducive to industries as high-technology.

BRIEF DESCRIPTION OF THE DRAWINGS

This and other features and advantages of the present invention will become more apparent upon a reading of the following detailed description and drawings, in which:

FIG. 8 is a table showing electric resistivities, thermal expansion coefficients, and fixing strengths, wherein compound ratios of Ag particles are listed at intervals of 10 vol % over a range of 0 vol % to 100.0 vol %;

FIG. 9 is a table showing measured electric resistivities, thermal expansion coefficients, and fixing strengths, wherein the compound ratio of Ag particles is set to 10.0 vol % and the content of a low melting point glass varies;

FIG. 10 is a table showing measured electric resistivities, thermal expansion coefficients, and fixing strengths, wherein the compound ratio of Ag particles is set to 20.0 vol % and the content of a low melting point glass varies;

FIG. 11 is a table showing measured electric resistivities, thermal expansion coefficients, and fixing strengths, wherein the compound ratio of Ag particles is set to 30.0 vol % and the content of a low melting point glass varies;

FIG. 12 is a table showing measured electric resistivities, thermal expansion coefficients, and fixing strengths, wherein the compound ratio of Ag particles is set to 40.0 vol % and the content of a low melting point glass varies;

FIG. 13 is a table showing measured electric resistivities, thermal expansion coefficients, and fixing strengths, wherein the compound ratio of Ag particles is set to 50.0 vol % and the content of a low melting point glass varies;

FIG. 14 is a table showing measured electric resistivities, thermal expansion coefficients, and fixing strengths, wherein the compound ratio of Ag particles is set to 60.0 vol % and the content of a low melting point glass varies;

FIG. 15 is a table for deciding optimum contents of filler and metal oxide series pigment;

FIG. 16 is a table for deciding the weight ratio between Ag particles and low thermal-expansion-coefficient filler;

FIG. 17 is a table showing electric resistivities, thermal expansion coefficients, and fixing strengths, wherein the compound ratio of Ag particles is selected at intervals of 10% over a range of 0 vol % to 100.0 vol %;

FIG. 18 is a table showing measured electric resistivities, thermal expansion coefficients, and fixing strengths, wherein the compound ratio of Ag particles is set to 10.0 vol % and the content of a low melting point glass varies;

FIG. 19 is a table showing measured electric resistivities, thermal expansion coefficients, and fixing strengths, wherein the compound ratio of Ag particles is set to 20.0 vol % and the content of a low melting point glass varies;

FIG. 20 is a table showing measured electric resistivities, thermal expansion coefficients, and fixing strengths, wherein the compound ratio of Ag particles is set to 30.0 vol % and the content of a low melting point glass varies;

FIG. 21 is a table showing measured electric resistivities, thermal expansion coefficients, and fixing strengths, wherein the compound ratio of Ag particles is set to 40.0 vol % and the content of low melting point glass varies;

FIG. 22 is a table showing measured electric resistivities, thermal expansion coefficients, and fixing strengths, wherein the compound ratio of Ag particles is set to 50.0 vol % and the content of low melting point glass varies;

FIG. 23 is a table showing measured electric resistivities, thermal expansion coefficients, and fixing strengths, wherein the compound ratio of Ag particles is set to 60.0 vol % and the content of a low melting point glass varies;

FIG. 24 is a table for deciding optimum contents of filler and metal oxide series pigment; and FIG. 25 is a table for deciding the weight ratio between Ag particles and low-thermal-expansion filler.

DETAILED DESCRIPTION OF THE PREFERRED EMBODIMENTS

A conductive sintered material for fixing electrodes in electronic device envelopes, according to an embodiment of the present invention, will be described below in detail. Moreover, the case where a conductive material formed of a conductive compound is embodied to intermediately-bonded electrodes in a fluorescent display tube will also be described below in more detail.

Figure 1:
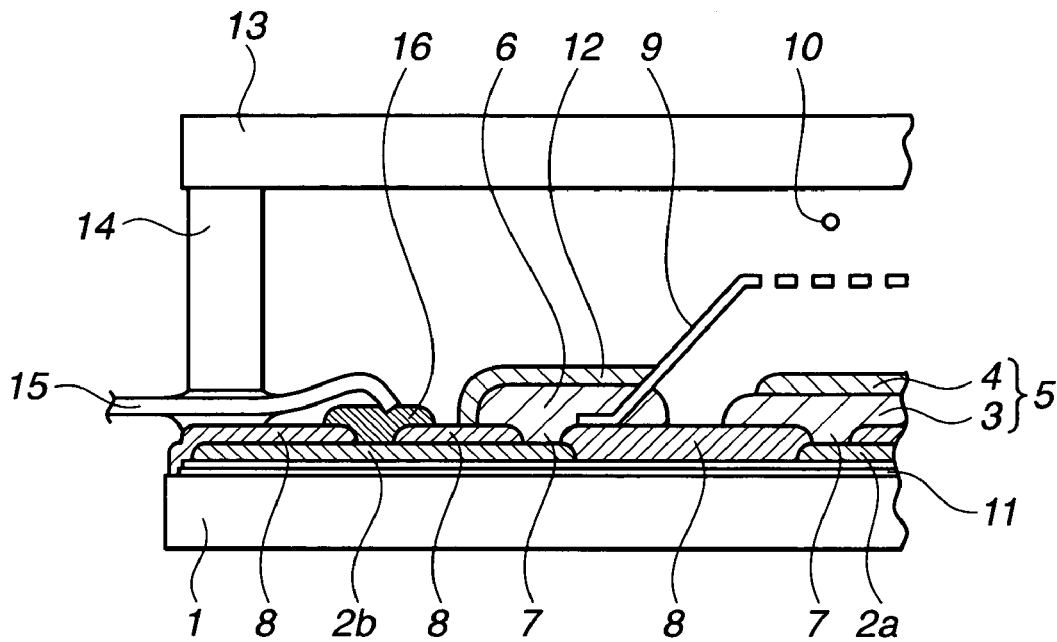
FIG. 1 is a cross sectional view illustrating partially and conceptually the major portion of a fluorescent display tube, to which a conductive sintered compact according to an embodiment of the present invention is applied in a general grid intermediately-bonded scheme.

The main configuration of a fluorescent display tube applied to the present embodiment is shown in FIG. 1. The previous explanation is applicable to this detailed description. Further detailed explanation will be later added to the previous description.

Figure 2:
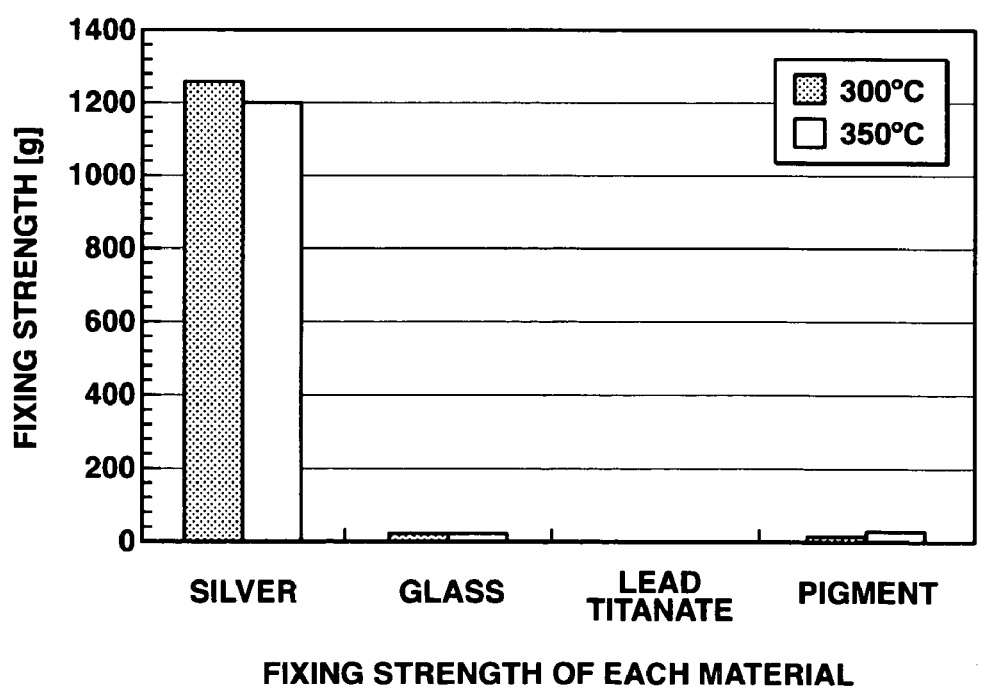
FIG. 2 is a graph comparing measured fixing strengths of Ag particle, PbO—$B_2O_3$ series melting point glass, lead titanate particle, and metal oxide series pigment, sintered at 300° C. to 350° C., each constituting a conductive compound as the intermediately-bonded electrode (a conductive sintered compact)

FIG. 2 shows measured fixing strengths of Ag particles constituting a conductive compound, a $PbO-B_2O_3$ series low-melting-point glass, and lead titanate, and a metal oxide series pigment, sintered at 300° C. and 350° C., respectively.

Referring to FIG. 2, Ag particles, a $PbO-B_2O_3$ series low-melting point glass, lead titanate, and metal oxide series pigment, as main components of the conductive compound, are calcined at 300° C. and 350° C., respectively, to make sintered compacts. Then, of the sintered compacts, the fixing strengths of Ag particles, a low melting point glass, lead titanate, and metal oxide series pigment were measured, respectively. As shown in FIG. 2, the strength of Ag particles was about 1200 g. The fixing strength of each of the low melting point glass, the lead titanate, and the metal oxide series pigment was 40 g or less. Hence, it was understood that the sintered material of Ag particles provides the highest fixing strength.

The present inventors repeated the experiment continuously and aggressively and examined the results. It was found again that when Ag particles are baked, the surface thereof begins to soften at a process temperature of 212° C. and changes to a nearly sintered state. Ag particles begin to change to a nearly calcined state at 212° C., regardless of the melting point of 960° C. thereof. It was inferred that the reason is that the fixing force is obtained through the sintering of a minute amount of $AgNO_3$ components remaining in Ag particles of interest. The $AgNO_3$ has a melting point of 212° C. In order to back up the reasoning, it was ascertained that when $AgNO_3$ is heated up to 444° C., Ag is separated out.

The fixing strengths of the conductive pastes were measured according to the following procedures. A conductive paste is first prepared by kneading Ag particles, being conductive materials, a low melting point glass, and fillers such as minerals. Patterned conductive pastes of 2.0 mm in diameter are formed on the upper surface of a soda lime glass being an insulating substrate. Conductive sintered compacts (electrodes 6) of 0.5 mm, 0.7 mm, 1.0 mm, or 2.0 mm in thickness were obtained by calcining the patterned pastes at a determined temperature.

Next, the insulating substrate, on which the respective conductive sintered materials are formed, is fixed. Using a push-pull gauge, each conductive sintered compact is pushed horizontally against the surface of the insulating substrate. The push-pull gauge reads a fixing strength as the value when the conductive sintered compact is peeled off from the insulating substrate (when the fixing strength of a conductive compound is measured, the same measuring method as that to the conductive sintered compact sintered at high temperatures is performed).

Moreover, the strong fixing strength of Ag particles (being a conductive material) was fully used. In order to use Ag particles as the material for the conductive compound (the conductive sintered compact equivalent to the electrode 6), which is not peeled off from the insulating substrate surface, 1) the content of Ag particles, being conductive materials, and 2) the contents of lead titanate and metal oxide pigment, being insulating mineral substances, were fully considered. Thus, a third sample paste (C) of the conductive compound of the present embodiment was prepared. First and second sample pastes (A) and (B), each the conventional conductive compound, were prepared. After the calcination process, the strengths of sample pastes (A), (B) and (C) were examined comparatively.

First Sample Paste (A):

The first sample paste (A) is a conductive paste of a conductive compound prepared using Ag particles and Al particles, each as a conductive material. That is, the first sample paste (A) is a conductive compound paste created by immersing and kneading a conductive material, made of 18.9 vol % of Ag particles and 39.9 vol % of Al particle, 22.0 wt % of a low melting point glass, 9.9 wt % of lead titanate, and 8.5 wt % of a metal oxide series pigment, each acting as a filler, in an organic vehicle. The organic vehicle is prepared by dissolving 1 wt % to 5 wt % of ethyl cellulose or other binder, in an organic solution such as terpinenol.

Second Sample Paste (B):

The second sample paste (B) is a conductive paste of a conductive compound prepared using Ag particles only as conductive materials. That is, the second sample paste (B) is a conductive compound paste created by immersing and kneading a conductive material made of 29.9 wt % of Ag particles, 32.3 wt % of a low melting point glass, and 13.5 wt % of lead titanate and 24.3 wt % of a metal oxide series pigment, each acting as a filler, in an organic vehicle. The organic vehicle is prepared by dissolving an organic solution such as terpinenol.

Third Sample Paste (C):

The third sample paste (C) is a conductive paste of a conductive compound prepared using Ag particles only as conductive materials. The composition ratio between Ag particles and the filler is improved. That is, the third sample paste (C) is a conductive compound paste created by immersing and kneading a conductive material made of 22.5 vol % of Ag particles, 15.0 vol % of a low melting point glass, and 52.5 vol % of lead titanate and 10.0 vol % of a metal oxide series pigment of 10.0 vol %, each acting as a filler, in an organic vehicle. The organic vehicle is prepared by dissolving 1 vol % to 5 vol % of ethyl cellulose and other binders in an organic solution such as terpinenol.

Figure 3:
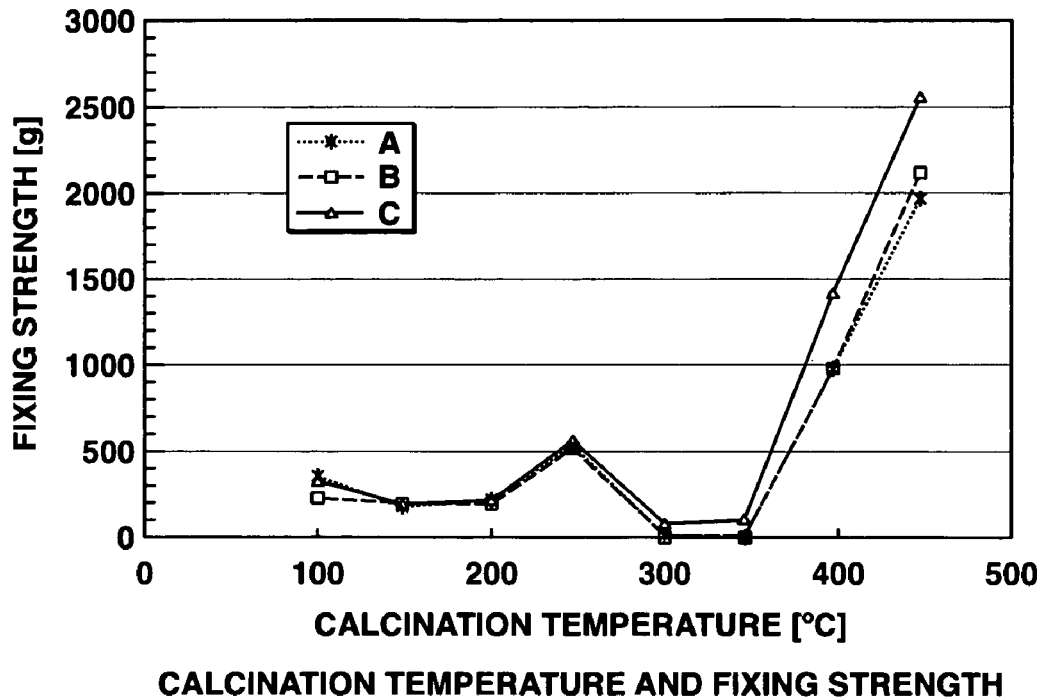
FIG. 3 is a graph plotting fixing strengths of sample conductive pastes, (A), (B) and (C), coated and patterned on the upper surface of a soda lime glass and calcined over a range of 100° C. to 500° C., the pastes, (A), (B) and (C), corresponding to the first, second and third conductive compounds, respectively.

FIG. 3 shows the measured fixing strengths of the first, second, and third sample conductive pastes, (A), (B) and (C), coated and patterned on the upper surface of a soda lime glass by a screen printing process and then calcined over a range of 100° C. to 500° C. Referring to FIG. 3, during the calcination process, the conductive compounds remain fixed with the binder, at temperatures between 100° C. and 200° C. However, the binder evaporates at a high temperature of 300° C. to 350° C. while the low melting point glass is not vitrified, so that the fixing strength is not enough. Since the low melting point glass is completely vitrified at a temperature of 350° C. to 500° C., the fixing strength increases.

Figure 4:
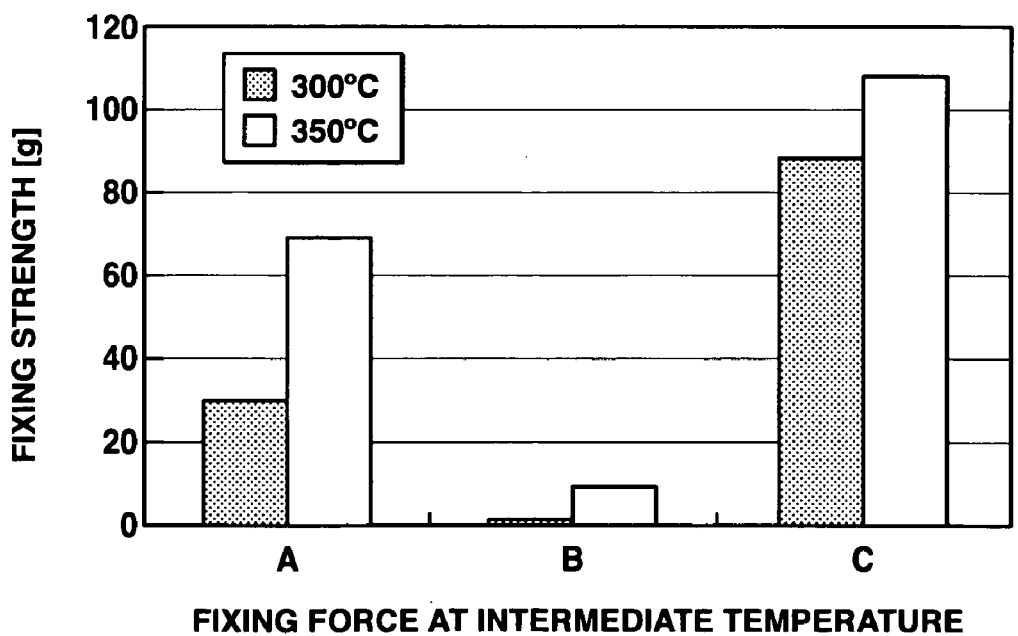
FIG. 4 is a graph plotting fixing strengths of sample conductive pastes, (A), (B) and (C), coated and patterned on the upper surface of a soda lime glass and calcined at 300° C. and 350° C., said pastes, (A), (B) and (C), corresponding to the first, second and third conductive compounds respectively.

FIG. 4 shows measured fixing strengths of the first, second and third conductive pastes, (A), (B) and (C), coated and patterned on the upper surface of a soda lime glass by the screen printing process and then sintered at 300° C. and 350° C.

FIG. 4 shows measured fixing strengths in the calcination process at 300° C. and 350° C. As described above, the calcination temperature corresponds to the processing temperature which thermally deforms the grid electrode 9, thus beginning to apply a stress load to the fixing interface between the electrode 6 and the insulating substrate. Of the first, second and third sample pastes (A), (B) and (C), the third sample paste (C) in this embodiment indicated the strongest fixing strength, that is, about 90 g at 300° C. and about 110 g at 350° C.

In a fluorescent display tube, when the surface electric resistivity of the electrode 6 exceeds 10 $\Omega/\square$, it sharply drops the voltage applied to the grid electrode. Since this phenomenon darkens the display on the front surface of the fluorescent display tube, it is desirable that the surface electric resistivity of the electrode 6 is 10 $\Omega/\square$ or less.

The composition ratio between PnO—$B_2O_3$ series low melting point glass having a thermal expansion coefficient of $108.0 \times 10^{-7}$/° C. and a lead titanate (acting as a filler) having $60.0 \times 10^{-7}$/° C. were adjusted. Thus, when the composition ratio of Ag particles having a thermal expansion coefficient of $197.0 \times 10^{-7}$/° C. was changed by 0 to 10%, the resistivity and thermal expansion coefficient of the conductive compound were adjusted such that the thermal expansion coefficient exceeds $65.0 \times 10^{-7}$/° C. Then, the respective sample pastes were examined.

In this case, the metal oxide series pigment prevents the external light reflected by the conductive compound and adjusts the thermal expansion coefficient of the conductive compound in cooperation with the filler. Hence, if the content is fixed to 10% and 10.0 vol % of the metal oxide series pigment exists, a conductive sintered compact of a desired thermal expansion coefficient can be obtained even with no presence of the filler.

Moreover, a conductive compound paste was prepared by immersing and kneading mineral solid materials in an organic vehicle, which is obtained by dissolving 1 wt % to 5 wt % ethyl cellulose and other binders in an organic solution such as terpinenol. Then, the conductive compound paste was coated and patterned on the upper surface of a soda glass substrate by the screen printing process and then is sintered at 350° C. and 450°. Thus, a conductive sintered compact was obtained. The electric resistivity and thermal expansion coefficient of the conductive sintered compact were measured.

FIG. 8 shows electric resistivities, thermal expansion coefficients and fixing strengths when the compound ratio of Ag particles is set at 10% intervals over a range of 0 vol % to 100.0 vol %. As apparent from FIG. 8, when the content of Ag particles is 10.0 vol % or more, the surface electric resistivity is 10 $\Omega/\square$ or less. When Ag particles are 10.0 vol % or more, a fixing strength of 80 g is obtained in the sintering process of 350° C. and a fixing strength of 1300 g or more is obtained in the sintering process of 450° C. These fixing strengths were enough in an intermediate course of fabrication of a fluorescent display tube or for the completed product.

The grid electrode 9 made of the first sample paste (A) being one of the conventional conductive compounds was peeled off with a spring balance to measure the fixing strength. The fixing strength in the case of the calcination at 450° C. was 180 g. When the grid electrode 9 was pulled off, the electrode 6, made through cooling after the calcination at 450° C., was peeled off from the substrate surface, together with the grid electrode 9. In contrast, the grid electrode 9, made of the conductive compound paste according to the present invention, was subjected to the fixing strength test that peels it off with the spring balance. In the calcination process at 450° C., the fixing strength was 200 g or more. Even when the grid electrode 9 was peeled off from the electrode 6 made through cooling after the calcination process at 450° C., the grid electrode 9 only was peeled off and the electrode 6 itself remained anchored without being peeled off from the substrate surface. In this case, the electrode 6 itself was not peeled off while the generation of cracking on the substrate side was dramatically decreased.

On the other hand, when the content of Ag particles exceeds 70.0 vol %, the thermal expansion coefficient exceeds $153.7 \times 10^{-7}$. It was understood that cracking occurs when the conductive electrode is formed on the surface of a soda lime glass. Based on the results, it is preferable that the content of Ag particles is 10.0 vol % to 60.0 vol %, preferably, 10.0 vol % to 35.0 vol %.

In order to determine the composition ratio range of the content of a low melting point glass, the composition ratio of the low melting point glass was changed. Thus, when the content of the metal oxide series pigment is fixed to 10.0 vol % and the content of Ag particles is 10.0 vol % to 60.0 vol %, the thermal expansion coefficient exceeds $60.0 \times 10^{-7}$/° C. Thus, a conductive paste was created by combining Ag particles, fillers and metal oxide series pigment. The conductive paste was coated and patterned on the surface of a glass substrate by the screen printing process and was calcined at 350° C. to 450° C. to make a conductive sintered compact. FIGS. 9 to 14 show the electric resistivity, thermal expansion coefficient, and fixing strength of the resulting conductive sintered compacts.

As apparent from FIGS. 9 to 14, when the content of the low melting point glass is less than 10.0 vol %, the fixing strength is less than 100 g and insufficient. Moreover, when the content of the low melting point glass exceeds 70.0 vol %, the thermal expansion coefficient is $153.7 \times 10^{-7}$/° C. Hence, it is preferable that the content of a low melting point glass is within a range of 10.0 vol % to 70.0 vol %.

Next, in order to obtain the optimum contents of filler and a metal oxide series pigment, a conductive paste was prepared. The content of Ag particles was set to an upper limit of 10.0 vol % and a lower limit of 60.0 vol %. The content of a low melting point glass was set to a lower limit of 10.0 vol % and an upper limit of 30.0 vol %. The content of a metal oxide series pigment was set to 10.0 vol %. Similarly, the conductive paste was coated and patterned on the surface of a glass substrate and then calcined at 350° C. and 450° C. to obtain a conductive sintered compact. The measurement results of the electric resistivity, thermal expansion coefficient, and adhesive strength of the resulting conductive sintered compact are shown in FIG. 15.

As shown in FIG. 15, the filler is synergized with the metal oxide series pigment. Even if the sintered compact contains 70.0 vol % of filler, the fixing strength necessary for the electrode 6 is obtained if the sintered material contains 10.0 vol % of Ag particles and 10.0 vol % of a low melting point glass.

FIG. 16 shows the crack state of the substrate in the case where the conductive compound is used as the electrode 6 in a fluorescent display tube. In this example, the content of Ag particles was between 10.0 vol % and 60.0 vol % and the content of lead titanate (or low expansion filler) was adjusted. Thus the conductive compound was prepared so as to set the thermal expansion coefficient to $60.0 \times 10^{-7}/°$ C. or more.

As a result, it was found that this process is practical when the volume ratio between Ag particles and low expansion filler is 1:7 to 5:3. In this case, lead titanate was chiefly used as the filler. However, it was confirmed that a similar effect is obtained even when the zircon has a thermal expansion coefficient of $40.0 \times 10^{-7}/°$ C. and lead titanate of a thermal expansion coefficient has $60.0 \times 10^{-7}/°$ C. or less.

A conductive paste was prepared by immersing and kneading 10.0 vol % to 60.0 vol % of Ag particle, 10.0 vol % to 80.0 vol % of a low melting point glass, 0 vol % to 70 vol % of a filler, and 5.0 vol % to 80.0 vol % of a metal oxide series pigment, in an organic vehicle. In this embodiment, when the conductive paste was calcined at 300° C. to 500° C., a conductive sintered compact having a thermal expansion coefficient of $83.3 \times 10^{-7}/°$ C. to $131.0 \times 10^{-7}/°$ C. was obtained.

In that case, it is preferable that the grain size of each of the Ag particles, low melting point glass, and filler is 1 μm to 20 μm. That is, when the grain size is too large, the compression in the fusion of Ag particles and low melting point glass decreases, so that the electric resistivity increases. Moreover, particles having an excessively large grain size are difficult to pass through the mesh opening of 60 μm in side length, usually used in the screen printing process. In contrast, when the grain size is too small, particles are filled densely to each other. For that reason, the binder filled between particles forms blisters (spaces) in the calcination process, so that the fixing strength decreases.

It is desirable that Ag particles are flaky because when the low melting point glass melts, Ag particles in contact with the surfaces thereof lead to lowering the electric resistance of the electrode. In consideration of the figure of the low melting point glass and the filler, blending particles only in flake form causes a high thixotropy, thus complicating the workability. For a suitable leveling property, a conductive paste, formed of particles in a flake shape and in a spherical shape, may be used, thus improving the printing property.

Next, the embodiment where the conductive sintered compact or the electrode 6 is used as a conductive adhesive agent for anchoring the grid electrode 9 in a fluorescent display tube will be described below in detail, by referring to FIG. 1.

As describe previously, in the fluorescent display tube shown in FIG. 1, the glass substrate 1, the front plate 13, and the side plates 14 form an envelope. Wiring conductors 2a and 2b are selectively formed on corresponding areas of the thin $SiO_2$ film 11 overlying the glass substrate 11. The insulating film 8 is coated and patterned over the wiring conductors 2a and 2b by the screen printing process. A black pigment is mixed in the insulating layer 8 and works as the black background of the fluorescent display tube.

The wiring conductor 2a is the wiring layer for connecting the anode electrode 5, including the anode conductor 3 and the fluorescent substance 4, (hereinafter expediently referred to as an anode wiring layer 2a). The wiring conductor 2b is the wiring layer for connecting the wiring electrode 9, the electrode 6, and the terminal electrode 16. The grid electrode 9 confronts the cathode electrode 10 disposed above in the envelope. The electrode 6 is made of a conductive sintered compact fixing and anchoring the leg of the electrode 9. The terminal electrode 16 is the electrode of the metal lead 15 taken out from the envelope to receive external electrical signals (hereinafter expediently referred to as a grid wiring layer 2b). The anode wiring layer 2a is connected to the anode electrode 5 via the through hole 7 and the grid wiring layer 2b is connected to the electrode 16 via the through hole 7.

As to the electrode 6, a conductive compound containing 20.0 vol % to 24.0 vol % (preferably, 22.5 vol %) of Ag particles (acting as a conductive material) having a grain size of 1 μm to 10 μm, (preferably, 15.0 vol % of) PbO—$B_2O_3$ (acting as a fritted glass being part of an adhesive component) having a grain size of 1 μm to 20 μm, 48.5 vol % to 55.0 vol % (preferably, 52.5 vol %) of lead titanate (acting as a filler), and 7.5 vol % to 14.5 vol % (preferably, 10.0 vol %) of Cu—Cr series pigment (acting as a metal oxide series pigment) having a grain size of 1 μm to 20 μm, was prepared. Moreover, an organic vehicle was prepared by dissolving 1 wt % to 5 wt % of a binder such as ethyl cellulose in an organic solution such as terpinenol, to improve the printing property. In a manner similar to the conventional manner, about 6.0 vol % of the conductive compound is immersed and kneaded into an organic vehicle to make a paste. The resultant paste was used as a conductive paste.

In succession, the procedure of firmly fixing the grid electrode 9 to the electrode 6 will be described below. First, the conductive paste is coated and patterned on the main area of the glass substrate 1 by the screen printing process. Thereafter, the leg of the grid electrode 9 is placed and held on a corresponding portion of the conductive paste pattern. Next, the intermediate structure is baked, as it is. The organic components in the conductive paste are decomposed and evaporated so that the conductive paste transforms into a conductive sintered compact. The conductive sintered compact firmly anchors the grid electrode 9 onto the grid wiring layer 2b.

The front plate 13 and the side plates 14 are hermetically fixed to the anode substrate (or the glass substrate 1) to make an envelope. The inside of the envelope is evacuated in vacuum so that a fluorescent display tube is completed. With the increasing applications of the fluorescent display tubes, a relatively thin $SiO_2$ film 11 is often formed between the glass substrate 1 and the insulating layer 8 or a crystalline glass layer 12 is often formed on the upper surface of the electrode 6, that is, the conductive sintered compact.

Advantageously, in the fluorescent display tube using the conductive sintered material for the electrode 6, the patterned conductive paste (the electrode 6) did not crack in the baking process. Similarly, the glass substrate 1 did not crack. The $SiO_2$ film 11 of about 1.0 mm thick formed on the glass substrate 1 did not peel off. The reason will be described below in detail.

The thermal expansion coefficient of the soda lime glass is 85.0 to $90.0 \times 10^{-7}/°$ C. The thermal expansion coefficient of the insulating layer is 65.0 to $80.0 \times 10^{-7}/°$ C. On the other hand, the thermal expansion coefficient of the PbO—$B_2O_3$ series low melting point glass, used conventionally, is 100.0 to $120.0 \times 10^{-7}/°$ C. The thermal expansion coefficient of the lead titanate, used conventionally, is 40.0 to $65.0 \times 10^{-7}/°$ C. Of course, the thermal expansion coefficients of the latter two materials are larger than that of the glass.

$Bi_2O_3$—$B_2O_3$ series low melting point glass has a thermal expansion coefficient of 70.7 to $90.0 \times 10^{-7}/°$ C. This thermal expansion coefficient is closer to the thermal expansion coefficient of glass, compared with the PbO—$B_2O_3$ series low melting glass and the lead titanate. The $Bi_2O_3$—$B_2O_3$ series low melting point glass does not include lead, which is an environmental load substance. Zircon having a thermal expansion coefficient of 35.0 to $45.0 \times 10^{-7}/°$ C. was used as filler to the $Bi_2O_3$—$B_2O_3$ series low melting point glass. By doing so, an attempt of approaching the thermal expansion coefficient of the sintered compact to that of glass was made.

Figure 5:
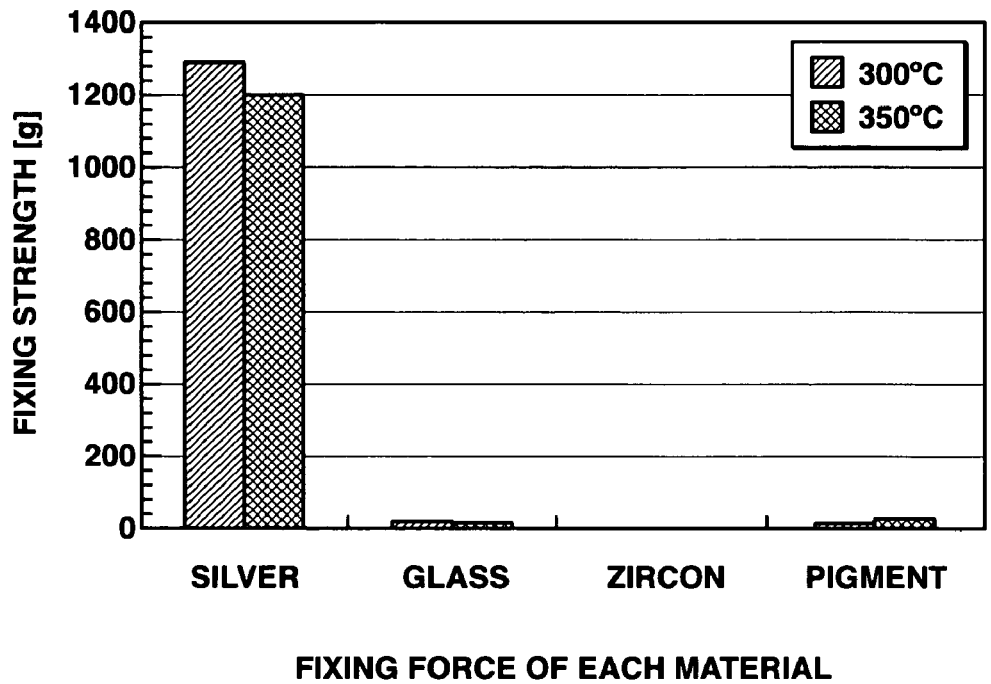
FIG. 5 is a graph comparing measured fixing strengths of Ag particles, $Bi_2O_3$—$B_2O_3$ series low melting point glass, zircon particles, and metal oxide series pigment, calcined at 300° C. and 350° C., each constituting a conductive compound as the intermediately-bonded electrode (a conductive sintered compact)

The main components of the conductive compound, that is, Ag particles (conductive material), $Bi_2O_3$—$B_2O_3$ series low melting point glass (a low melting point glass containing $B_2O_3$), zircon particles, and metal oxide series pigment were calcined at 300° C. and 350° C., respectively. Thereafter, the fixing strengths of the resultant sintered compacts were measured. FIG. 5 shows the measured fixing strengths of Ag particles, $Bi_2O_3$—$B_2O_3$ series low melting point glass, zircon particles, and metal oxide series pigment, each calcined at 300° C. and 350° C.

As shown in FIG. 5, the fixing strength of Ag particles was strongest, that is, about 1200 g to 1300 g. The fixing strengths of the $Bi_2O_3$—$B_2O_3$ series low melting point glass, the filler, and the pigment were 30 g or less, respectively.

The present inventors aggressively repeated the experiment. It was found that the surfaces of Ag particles soften in the calcination process at 212° C. and begins to become a nearly sintered state. As to the phenomenon that Ag particles having a melting point of 960° C. begin to become a nearly sintered state, the present inventors reasoned that a minute amount of $AgNO_3$ having a melting point of 212° C., contained in Ag particles, are calcined to provide the fixing strength. In order to support the reasoning, it was confirmed that when $AgNO_3$ is heated up to 444° C., Ag is separated out.

According to the previously described manner, conductive pastes were prepared by kneading mineral particles including Ag particles, low melting point glass, and filler, each having a diameter of 2 mm, in organic vehicles, respectively. Then, the resultant conductive pastes are coated on the upper soda lime glasses (insulating substrates), respectively. These samples were baked at predetermined temperatures. Finally, conductive sintered compacts (the electrodes 6), having a thickness of 0.5 mm, 0.7 mm, 1.0 mm, and 2.0 mm, were obtained, respectively.

With the insulating substrates securely fixed, each conductive sintered compact is pushed in parallel to the surface of the insulating substrate using a push-pull gauge. The fixing strength at which each conductive sintered compact is peeled off is read with the push-pull gauge.

In order to find out the cause for the conductive compound peeling off from the substrate, the following sample pastes were prepared as conductive compound forming materials, being conventional conductive electrodes. That is, 1) the content of Ag particles (being conductive materials) and 2) the contents of lead titanate and metal oxide series pigment, each being an insulating mineral material, were considered. In addition, a fourth sample paste (D), being a paste of the conductive compound according to the present embodiment, and the fifth sample paste (E), being a paste of the conventional conductive compound, were prepared. The sample pastes (D) and (E) were calcined and the fixing strengths of the resultant sintered compacts were examined comparatively.

Fourth Sample Paste (D):

The fourth sample paste (D) is a conductive paste of a conductive compound containing only the Ag particles as conductive materials, in this embodiment. The fourth sample paste (D) is a conductive compound paste. That is, the conductive compound paste is prepared by immersing and kneading a conductive paste made of 29.9 vol % of Ag particles, 32.3 vol % of a low melting point glass, and 13.5 vol % of zircon and 24.3 vol % of metal oxide series pigment, each being a filler, in an organic vehicle. The organic vehicle is made by dissolving 1 wt % to 5 wt % of ethyl cellulose and other binders in an organic solvent such as terpinenol.

Fifth Sample Paste (E):

In the fifth sample paste (E), Ag particles (conductive substances) were increased in quantity, compared with the conventional quantity. Moreover, the Ag particle to filler composition ratio was improved. The fifth sample paste (E) is a conductive compound paste. Specifically, the conductive paste is prepared by immersing and kneading a conductive paste made of 22.5 vol % of Ag particles, 15.0 vol % of a low melting point glass, and 52.5 vol % of zircon and 10.0 vol % of metal oxide series pigment, each being a filler, in an organic vehicle. The organic vehicle is made by dissolving 1 wt % to 5 wt % of ethyl cellulose and other binders in an organic solvent such as terpinenol.

Figure 6:
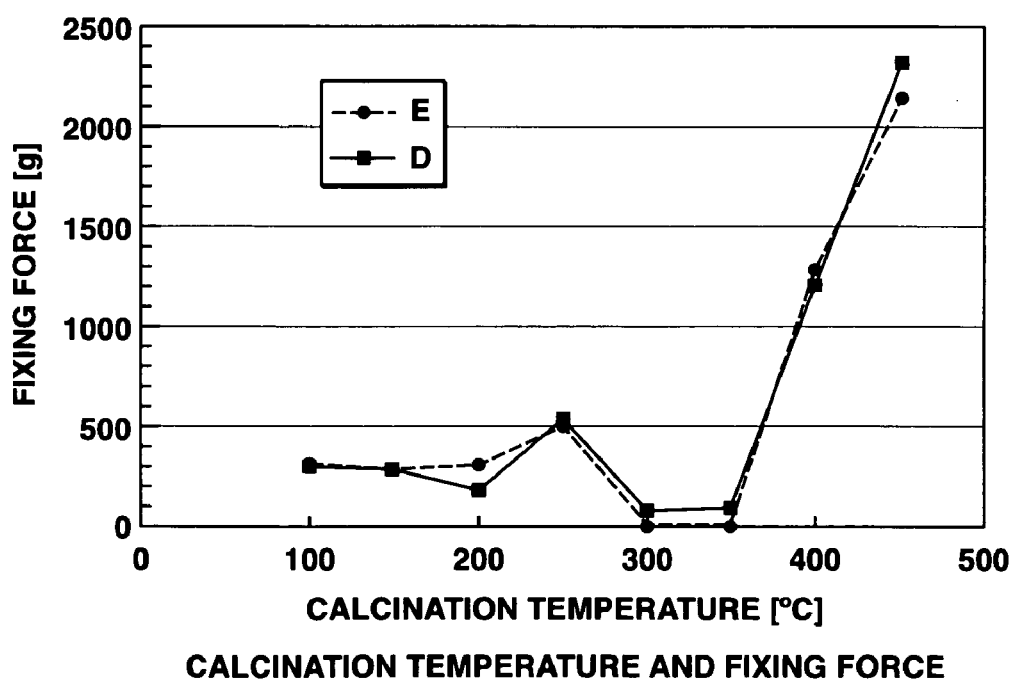
FIG. 6 is a graph plotting fixing strengths of sample conductive pastes, (D) and (E), coated and patterned on the upper surface of a soda lime glass and calcined over a range of 100° C. to 500° C., said pastes, (D) and (E), corresponding to the fourth and fifth conductive compounds respectively.

FIG. 6 shows measured fixing strengths of sintered compacts. The fourth sample paste (D) (to be converted into a conductive compound) is coated and patterned on the upper surface of a soda lime glass. The fifth sample paste (E) (to be converted into a conductive compound) is coated and patterned on the surface of a soda lime glass. Then, the two conductive pastes were baked over a range of 100° C. to 500° C. to obtain the adhesive forces.

Referring to FIG. 6, the binder firmly fixes the conductive compound nearly over the temperatures of 100° C. to 200° C., in the calcination process, in a manner nearly similar to that in FIG. 3. However, the binder evaporates at high temperatures of 300° C. to 350° C. while the low melting point glass is not vitrified. Therefore, the fixing force is not sufficient or is poor. When the calcination temperature rises up to 350° C. to 500° C., the low melting point glass finally vitrified. As a result, the fixing force becomes large.

Figure 7:
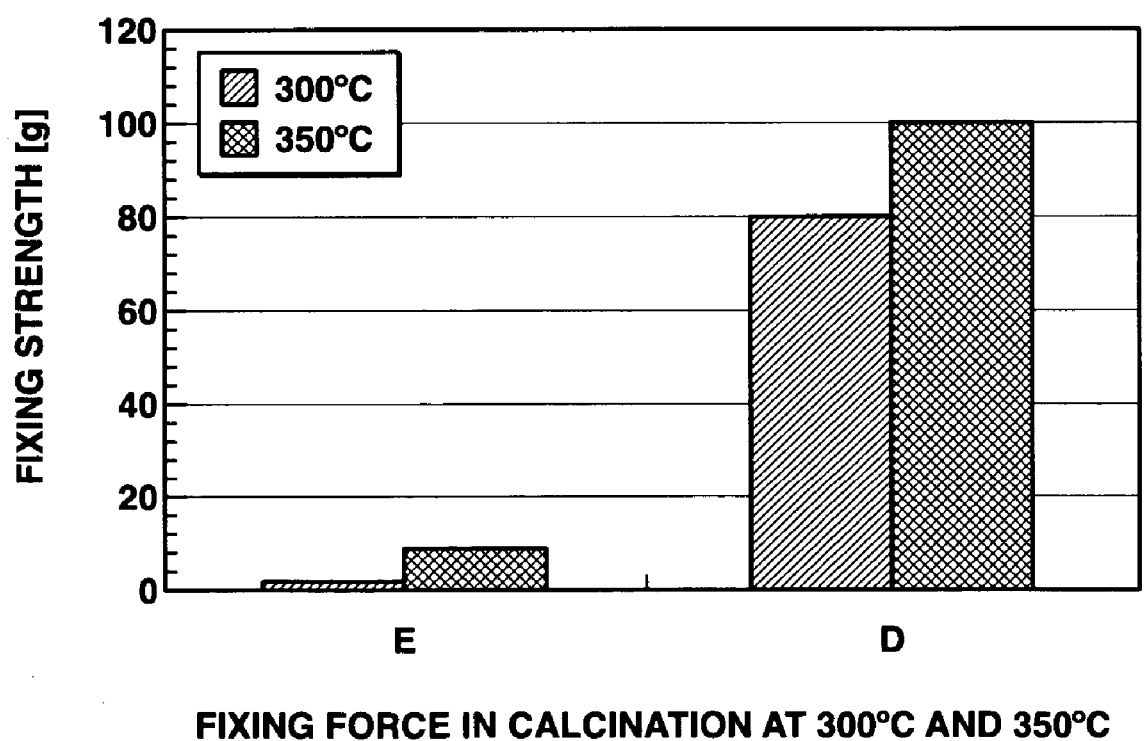
FIG. 7 is a graph comparing fixing strengths of sample conductive pastes, (D) and (E), coated and patterned on the upper surface of a soda lime glass and calcined at 300° C. and 350° C., said pastes, (D) and (E), corresponding to the fourth and fifth conductive compounds respectively.

FIG. 7 shows measured fixing strengths of the fourth and fifth sample pastes, (D) and (E), calcined. That is, the fourth sample paste (D) (to be the conductive compound) is coated and patterned on the upper surface of a soda lime glass. The fifth sample paste (E) (to be the conductive compound) is coated and patterned on the upper surface of a soda lime glass. Then, the two sample pastes (D) and (E) are calcined at 300° C. to 350° C. to obtain the fixing force.

Referring to FIG. 7, the fourth sample paste (D) indicated the strongest fixing strength, that is, about 90 g at 300° C. and about 110 g at 350° C. In the calcination process at 300° C. to 350° C., the grid electrode 9 begins to thermally deform and extend resulting in a stress load being applied to the interface between the electrode 6 and the insulating substrate.

Ag particles, being conductive materials, and filters are increased in quantity and the conductive material is reduced in quantity as a whole. When the electric resistance value of the electrode 6 exceeds 10 Ω/□, the voltage applied to the grid electrode 9 sharply drops, so that the fluorescent display tube becomes dimmed. Therefore, it is desirable that the surface electric resistivity of the electrode 6 is 10 Ω/□ or less.

The composition ratio between $Bi_2O_3$—$B_2O_3$ series melting point glass having a thermal expansion coefficient of 70.0 to $90.0 \times 10^{-7}$/° C. and zircon, acting as a filler, having a thermal expansion coefficient of 35.0 to $45.0 \times 10^{-7}$/° C. is adjusted. By doing so, when the composition ratio of Ag particles having a thermal expansion coefficient of $197.0 \times 10^{-7}$/° C. varies 0 to 100%, the electric resistivity and thermal expansion coefficient of the conductive compound are adjusted to the thermal expansion coefficient larger than $65.0 \times 10^{-7}/°$ C. Thereafter, these items were examined.

In that case, the metal oxide series pigment can prevent external light reflected from the conductive compound and can adjust the thermal expansion coefficient of the conductive compound in cooperation with the filler. For that reason, if 10 vol % of the pigment is maintained and contained, a conductive sintered compact having a predetermined thermal expansion coefficient can be obtained even when there are no fillers.

Moreover, a conductive compound paste was prepared by immersing and kneading a solid material in an organic vehicle. The organic vehicle is obtained by dissolving 1 wt % to 5 wt % of ethyl cellulose or other binders in an organic solvent such as terpinenol. The resultant conductive compound paste was coated and patterned on the upper surface of a soda lime glass by the screen printing process, and the intermediate structures were sintered at 350° C. and 450° C. to obtain conductive sintered compacts. Then, the electric resistivities and thermal expansion coefficients of the conductive sintered compacts were measured respectively.

FIG. 17 shows the electric resistivity, thermal expansion coefficient, and fixing strength, wherein the Ag particle composition ratios are listed at intervals of 10% between 0 vol % and 100.0 vol %. As apparent from FIG. 17, when the content of Ag particles is 10.0 vol % or more, the surface electric resistivity is 10 Ω/□ or less. With Ag particles of 10.0 vol % or more, the fixing strength is 80 g at a calcination temperature of 350° C. and is 1300 g at a calcination temperature of 450° C. The fixing strength was sufficient for fluorescent display tubes under fabrication or for completed products.

The fixing strengths were measured by peeling off the grid 9 made of the sample paste (D), corresponding to one of the conventional conductive compounds, with a spring balance. In the calcination process of 450° C., the fixing strength is 150 g. As to the electrode 6 made through cooling after the 450° C. calcination process, the grid electrode 9 only was peeled off in the peeling test. The electrode 6 itself was left on the substrate surface, without being peeled off. In this case, the electrode 6 was not peeled off while the cracking of the substrate was reduced remarkably.

However, when the content of Ag particles exceeds 70.0 vol %, the thermal expansion coefficient becomes $153.7 \times 10^{-7}/°$ C. or more. It was found that the corresponding conductive electrode is formed on the surface of a soda lime glass and cracking occurs. Judging from the results, it is desirable that the content of Ag particles is 10.0 to 60.0 vol %, preferably, 10.0 to 35.0 vol %.

Furthermore, to ascertain the range of the composition ratio of the content of low melting point glass, a conductive paste was prepared in a combination of Ag particles, fillers, and metal oxide series pigment. In this case, the composition ratio of the low melting point glass, such that the thermal expansion coefficient is larger than $60.0 \times 10^{-7}/°$ C. or more when the content of the metal oxide series pigment is set to 10.0 vol %, and the content of Ag particles is 10.0 vol % to 60.0 vol %. Then, the conductive paste is coated and patterned on the glass substrate surface by the screen printing process and then calcined at 450° C. to form a conductive sintered compact. The electric resistivity, thermal expansion coefficient, and fixing strength of the resultant conductive sintered compact were measured as shown in FIGS. 18 to 23.

As apparent from FIGS. 18 to 23, when the content of the low melting point glass is less than 10.0 vol %, the fixing strength is less than 100 g, which is not sufficient. When the content of the low melting point glass exceeds 70.0 vol %, the thermal expansion coefficient becomes $148.4 \times 10^{-7}/°$ C. Hence, the content of the low melting point glass preferably ranges from 10.0 vol % to 70.0 vol %.

Next, in order to obtain an optimum content of the filler and an optimum content of the metal oxide series pigment, a conductive paste was prepared. In this case, the content of Ag particles has a lower limit of 10.0 vol % and an upper limit of 60.0 vol %. The content of the low melting point glass has a lower limit of 10.0 vol % and an upper limit of 30.0 vol %. The content of metal oxide series pigment is set to 10.0 vol %. Then, the conductive pastes are coated and patterned on the surface of a glass substrate by the screen print process and then are calcined at 350° C. and 450° C., respectively, to obtain conductive sintered compacts. The electric resistivity, thermal expansion efficient, and fixing strength of each of the resultant conductive sintered compacts were measured as shown in FIG. 24.

As apparent from FIG. 24, the filler may be 70.0 vol % of metal oxide series pigment to expect the synergistic effect with the metal oxide series pigment or may contain 10.0 vol % of Ag particles and 10.0 vol % of low melting point glass. Thus, it is understood that the electrode 6, being the calcined conductive compound, has the necessary fixing strength.

FIG. 25 is a table for ascertaining the substrate in a cracked state when the conductive compound is used for the electrode 6 in a fluorescent display tube. In this case, the content of low melting point glass is set to 20.0 vol % smaller than that in the prior art. The content of Ag particles varies from 10.0 vol % to 60.0 vol %. The content of the filler (the low thermal expansion coefficient) is adjusted. Thus, a conductive compound was prepared in such a way that the thermal expansion coefficient after the calcination process is larger than $60.0 \times 10^{-7}/°$ C.

As a result, it is understood that there is no problem from a practical standpoint, provided that the $Bi_2O_3$—$B_2O_3$ series low melting point glass and zircon as filler are used and that the composition ratio between Ag particles and low thermal expansion filler is 1:7 to 11:5 by weight ratio.

A conductive paste is prepared by immersing and kneading 10.0 vol % to 60.0 vol % of Ag particles, 10.0 vol % to 80.0 vol % of low melting point glass, 0 vol % to 70.0 vol % of filler, and 5.0 vol % to 80.0 vol % of metal oxide series pigment, in an organic vehicle. The conductive paste is calcined at 300° C. to 500° C. Thus, the sintered compacts having an electric resistivity of 2 Ω/□ or less and a thermal expansion coefficient of $62.7 \times 10^{-7}/°$ C. to $133.35 \times 10^{-7}/°$ C. was obtained.

In that case, it is preferable that the grain size of each of Ag particles, low melting point, and filler is 1 μm to 20 μm. That is, when the grain size is too large, the compression in fusion of Ag particles and low melting point glass decreases, so that the electric resistivity increases. Moreover, the particles are difficult to pass through each mesh opening of 60 μm in side length of the screen usually used in the screen printing. In contrast, when the grain size is too small, the particles are filled in mutually and densely. Hence, this is not preferable because the binders between particles in the calcination process form blisters (spaces), thus decreasing the fixing strength.

It is preferable that Ag particles are in flake form. The reason is that Ag particles in flake form face-contact mutually when the low melting point glass fuses, thus reducing the electric resistance component of the sintered compact. In consideration of the form of the low melting point glass and the filler, the composition of particles in flake form only increases the thixotropy, so that the workability becomes difficult. Therefore, the conductive paste containing particles in flake form and in spherical form may be used to obtain a suitable leveling property, so that the printing property can be improved.

We claim:

1. A conductive sintered compact for fixing electrodes within an electronic device envelope, said conductive sintered compact being made by calcining of a conductive composition, said conductive composition comprising:
   10 vol % to 35 vol % of Ag particles;
   a low melting-point glass containing 10 vol % to 40 vol % of $B_2O_3$;
   45 vol % to 70 vol % of ceramic particles; and
   5 vol % to 10 vol % of metal oxides series pigments, wherein said ceramic particles comprise lead titanate or zircon.

2. The conductive sintered compact defined in claim 1, wherein said $B_2O_3$ contained in said low melting point glass is of $PbO$—$B_2O_3$ series.

3. The conductive sintered material defined in claim 1, wherein said $B_2O_3$ contained in said low melting point glass is of $Bi_2O_3$—$B_2O_3$ series.

4. The conductive sintered compact defined in claim 1, wherein the thermal expansion coefficient of said conductive compound is $83.3 \times 10^{-7}/°$ C. to $138.1 \times 10^{-7}/°$ C.

5. The conductive sintered compact defined in claim 1, wherein the thermal expansion coefficient of said conductive compound is $62.7 \times 10^{-7}/°$ C. to $125.5 \times 10^{-7}/°$ C.

6. The conductive sintered compact defined in claim 1, wherein the electric resisitivity of said conductive compound is 10 $\Omega/\square$ or less.

* * * * *

UNITED STATES PATENT AND TRADEMARK OFFICE
CERTIFICATE OF CORRECTION

PATENT NO. : 7,300,607 B2  
APPLICATION NO. : 10/855038  
DATED : November 27, 2007  
INVENTOR(S) : Toshiyuki Misonou et al.

Page 1 of 1

It is certified that error appears in the above-identified patent and that said Letters Patent is hereby corrected as shown below:

Column 17, Line 15 Claim 1  
"oxides" should be  
--oxide--

Column 18, Line 14 Claim 6  
"resisitivity" should be  
--resistivity--

Signed and Sealed this

Twenty-fourth Day of June, 2008

JON W. DUDAS  
*Director of the United States Patent and Trademark Office*